United States Patent

[11] 3,600,672

[72] Inventors Moritada Kubo
 Tokyo;
 Kuniji Asano, Kawasaki-shi, both of, Japan
[21] Appl. No. 840,008
[22] Filed July 8, 1969
[45] Patented Aug. 17, 1971
[73] Assignee Tokyo Shibaura Electric Co., Ltd.
 Kawasaki-shi, Japan
[32] Priority July 12, 1968
[33] Japan
[31] 43/48459

[54] METHOD FOR DETERMINING THE DEGREE OF ELONGATION OF ROLLED MAGNETIC METAL STRIPS AND AN APPARATUS FOR THE SAME
 6 Claims, 5 Drawing Figs.
[52] U.S. Cl. .................................................. 324/34 R,
 72/11, 33/147, 33/174
[51] Int. Cl. .................................................. G01r 33/12
[50] Field of Search.......................................... 324/34, 61,
 65; 33/147, 147 L, 147 N, 172 F, 174 L; 72/11;
 250/219 F, 219 OF

[56] References Cited
 UNITED STATES PATENTS
 3,256,610 6/1966 Brys ........................... 324/34 X
 3,502,968 3/1970 Tobin, Jr. et al. ............. 324/40

*Primary Examiner*—Rudolph V. Rolinec
*Assistant Examiner*—R. J. Corcoran
*Attorney*—George B. Oujevolk

ABSTRACT: A method for determining the degree of elongation of rolled magnetic metal strips and an apparatus for the same which comprises bringing automatic induction detectors close to one side of a travelling rolled magnetic metal strip to cause changes with time in the displacement of the metal strip in the direction of its thickness to be detected in the form of changes in inductance, supplying outputs from the detectors to one side of an AC bridge circuit, demodulating outputs from the bridge circuit by a demodulator, differentiating the values of the demodulated outputs by differentiators, and squaring the differentiated values by square-law circuits, and detecting the momentary values of the degrees of elongation of said metal strip, thereby controlling its rolled form.

PATENTED AUG 17 1971 3,600,672
SHEET 2 OF 2
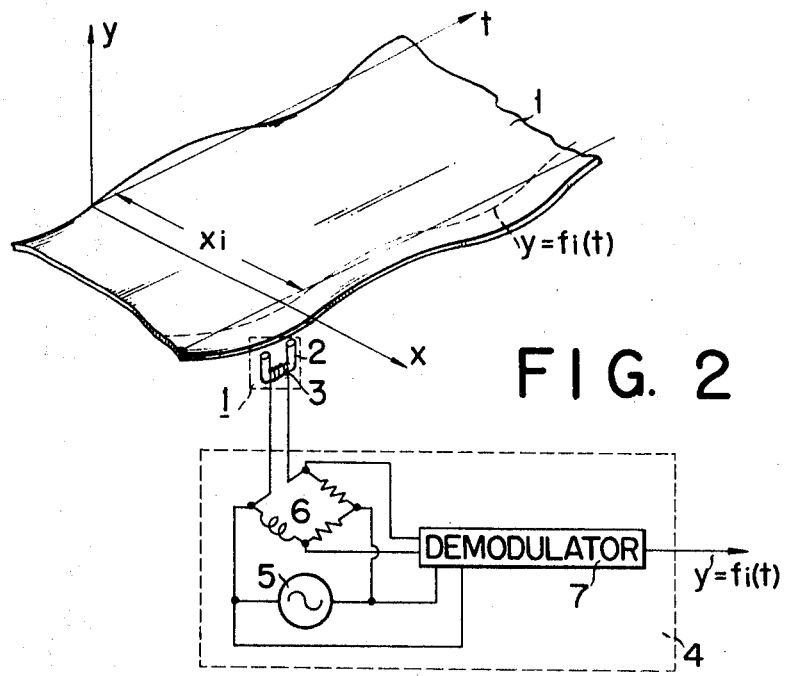
FIG. 2
FIG. 3A
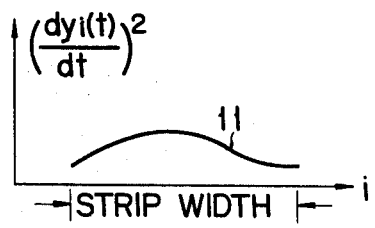
FIG. 3C
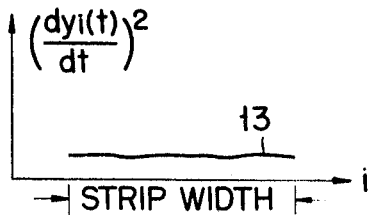
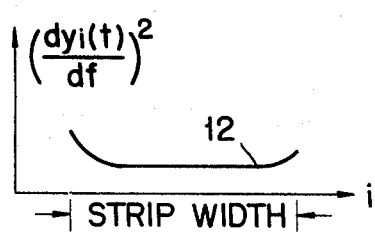
FIG. 3B
Moritada Kubo
Kuniji Asano
INVENTOR.
BY George B. Oujevolk
Attorney

METHOD FOR DETERMINING THE DEGREE OF ELONGATION OF ROLLED MAGNETIC METAL STRIPS AND AN APPARATUS FOR THE SAME

The present invention relates to a method for determining the degree of elongation of a rolled magnetic metal strip to control its form, particularly its flatness when it is rolled into a flat shape and also to an apparatus for the same.

When a metal strip is rolled, local different degrees of its elongation originating with uneven rolling result in the generation of deformed product. Said deformation of a metal strip appears in the form of undulations. These undulations may be broadly classified into those appearing along the edge portion of a metal strip (hereinafter referred to as "edge undulations") and those occurring at the central part thereof (hereinafter referred to as "central undulations"). It is known to those skilled in the art that the generation of such central or edge undulations can be prevented by crowning work rolls, or adjusting the extent of their curvature or screwdown, thereby controlling the flatness of a metal strip to a certain extent. However, before such control device intended to produce a flat metal strip can be effectively employed, it is necessary exactly to determine the condition of undulations appearing on the surface of a metal strip just released from the work rolls.

But accurate measurement of the degree of such deformation presents practical difficulties, because the metal strip travels at a high speed, and said measurement has to be made without mechanically touching the metal strip from the standpoint of preserving the durability of a measuring device.

Further, there are raised the following problems in controlling the form of a metal strip. Undulations occurring at the central part or along the edge of a metal strip while it is being rolled do not assume a fixed pattern, but vary irregularly. Moreover, the degree of elongation of a metal strip and the undulations appearing on its surface have a complicated relationship. For example, when undulations have a great wave length, the degree of elongation is small, even though the undulations have a fixed amplitude, whereas when the undulations have a short wave length, the degree of elongation becomes large. In addition, a quickly travelling metal strip itself vibrates in the direction of its thickness, so that it is difficult exactly to define its form.

The object of the present invention is to provide a method for effectively determining the degree of elongation of a rolled magnetic metal strip to control its flatness and an apparatus for the same.

The present invention can be more fully understood from the following detailed description when taken in connection with reference to the accompanying drawings, in which:

FIG. 2 is a concrete circuit diagram of part of the apparatus of FIG. 1; and

FIGS. 3A to 3C are respectively curve diagrams showing the various degrees of flatness of a metal strip in its transverse direction as determined by the apparatus according to the embodiment of FIG. 1.

Figure 1:
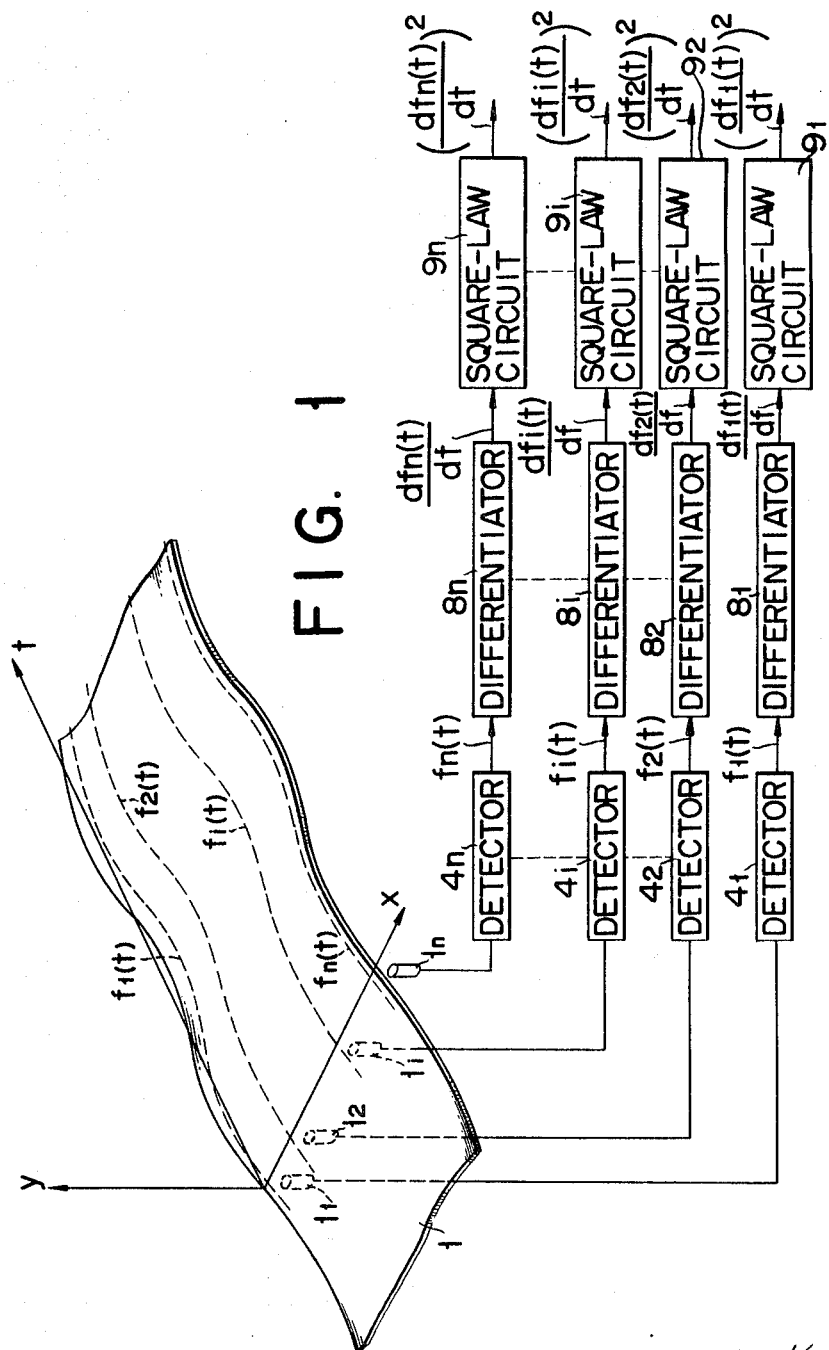
FIG. 1 illustrates the arrangement of an apparatus for determining the degree of elongation of a rolled magnetic metal strip according to an embodiment of the present invention.

Referring to FIG. 1, there are disposed an $n$ number of induction detectors $1_t$ to $1_n$ on one side of a rolled magnetic metal strip 1 just drawn out of a work-roll device (not shown) in such a manner that the detectors are spatially juxtaposed in the transverse direction (in the direction of $x$) of the metal strip in close proximity thereto. Each of the induction detectors $1_t$ to $1_n$ consists of, for example, a C-shaped core 2 wound with a coil 3 as shown in FIG. 2. The coil 3 is connected to one side of an AC bridge circuit 6 which in turn is connected to an AC source 5 involved in a detection circuit 4. The current from the AC source 5 is preferably so set as to have a frequency, for example, about 10 times the maximum frequency of undulations appearing on the surface of the metal strip 1. Outputs from the AC bridge circuit 6 are conducted to a demodulator 7. The demodulator 7 may consist of a rectifying circuit or synchronizing rectifying circuit and which is provided for converting outputs from said bridge circuit 6 to signals corresponding to the condition of undulations of the metal strip. If the bridge 6 is previously brought to a balanced state under the condition where there is not introduced a metal strip, then the amplitude of outputs from the bridge 6 represents the signals obtained by amplitude modulation of inputs from the AC source 5 which may be deemed as a carrier. Again if the bridge 6 is brought to a balanced state in advance under the condition in which there is carried a metal strip into a detection circuit arrangement, then outputs from the bridge 6 will be subjected to phase modulation. Outputs from said demodulator 7 represent the amounts of displacement $y$ of a metal strip as expressed by the equation 1 below.

$$y = fi(t) \quad \quad 1$$

With the direction of the thickness of the metal strip 1 designated as $y$ axis and the transverse direction thereof as an $x$ axis, the equation 1 denotes the displacement in the direction of the $y$ axis of a given point $xi$ on the $x$ axis as a function of time $t$. Referring again to FIG. 1, outputs from an $n$ number of detectors $1_t$ to $1_n$ are supplied to detector circuits $4_t$ to $4_n$ to obtain therefrom outputs $f1(t), f2(t)$ ..... or $fi(t)$ ..... $fn(t)$ respectively. These outputs are supplied to differentiation circuits $8_t$ to $8_n$ in turn for differentiation and further to square-law circuits $9_t$ to $9_n$, where said differentiated outputs are squared to obtain outputs $(df1(t)^2/dt)$ ..... $(dfn(t)/dt)^2$. Here, the square-law circuits $9_t$ to $9_n$ may be prepared from, for example, a combination of a well-known function filter and amplifier.

There will now be described the reason why the method of the present invention can determine the degree of elongation of a metal strip. The degree of elongation $ei$ of a metal strip on which there appears a progressive wave represented by the function of the equation 1 $y = fi(t)$ may be expressed by the equation 2 below.

$$ei = \frac{\sqrt{1 + \left(\frac{dfi(t)}{t}\right)^2 \cdot \Delta t - \Delta t}}{\Delta t} \quad (2)$$

where $\Delta t$ denotes a very small length of time. Since undulations normally have an extremely great wave length relative to the amplitude, there results a relationship of $(dfi(t)/dt) \ll 1$. Therefore the equation 2 may be further expressed by the equation 3 below.

$$ei \tfrac{1}{2}(dfi(t)/dt)^2 \quad \quad 3$$

When signals $fi(t)$ ($i = 1, 2$ ..... $n$) obtained from the detector circuits $4i$ ($i = 1, 2$ ..... $n$) are differentiated by passing through differentiation circuits $8i$ ($i = 1, 2$ ..... $n$) and the differentiated values of said signals are squared by passing through the square-law circuits $9i$ ($i = 1, 2$ ..... $n$), there are obtained outputs represented by $(dfi(t)/dt)^2$. When these outputs are multiplied by a constant, there are obtained the momentary values $ei$ ($i = 1, 2$ ..... $n$) of the degrees of elongation of a metal strip 1, as shown by the equation 3, at the points thereof facing the positions of the detectors $1i$. Thus determination of said degrees of elongation $ei$ of the metal strip 1 will naturally define its form. Namely, where the finally obtained momentary values $(dyi(t)/dt)^2$ of the degrees of elongation of the metal strip 1 at its central part are large as illustrated by the wave form 11 of FIG. 3A, then there appear central undulations. Where said momentary values $(dyi(t)/dt)^2$ along the edge of the metal strip 1 are large as indicated by the wave form of FIG. 3B, then there occur edge undulations. Again where said momentary values $(dyi(t)/dt)^2$ are uniformly distributed all along the transverse direction of the metal strip 1, then there are generated neither central nor edge undulations. Accordingly, if the degrees of elongation $ei$ are so controlled as to be distributed in a flat wave form, then it will be possible to obtain a metal strip free from any deformation.

As mentioned above, the method of the present invention enables the degrees of elongation of a rolled metal strip at any desired points to be exactly determined and also signals representing said degrees of elongation to be readily utilized as signals for adjusting the crowning, curvature and screwdown of a work roll device, thereby finally controlling the form of said metal strip while it is travelling.

What we claim is:

1. A method for determining the degree of elongation of rolled magnetic metal strips which comprises the process of detecting electrical signals representing variations in inductance corresponding to changes with time in the displacement of a rolled magnetic metal strip in the direction of its thickness while it is travelling, differentiating the detected signals and squaring the differentiated outputs to obtain the momentary values of the degrees of elongation of the metal strip, whereby the squared outputs can be used as signals for controlling the form of the metal strip.

2. A method for determining the degree of elongation according to claim 1 wherein the detecting process comprises those of detecting by induction detectors changes with time in the displacement of the magnetic metal strip in the direction of its thickness in the form of variations in inductance, supplying outputs from the detectors to an AC bridge circuit and demodulating outputs from said AC bridge circuit.

3. A method for determining the degree of elongation according to claim 1 which consists in detecting electrical signals representing variations in inductance corresponding to changes with time in the displacement of the magnetic metal strip in the direction of its thickness at several points in the transverse direction of the metal strip and differentiating and squaring each of these electrical signals.

4. An apparatus for determining the degree of elongation of rolled magnetic metal strips which comprises means for detecting electrical signals representing variations in inductance corresponding to changes with time in the displacement of the metal strip in the direction of its thickness while it is travelling a circuit for differentiating the detected electrical signals and a square-law circuit for squaring the differentiated outputs to obtain signals representing the momentary values of the degrees of elongation of the metal strip whereby the squared outputs can be used as signals for controlling the form of the metal strip.

5. An apparatus for determining the degree of elongation according to claim 4 wherein the detecting means comprise induction detectors disposed in close proximity to one side of the magnetic metal strip, an AC bridge circuit supplied with outputs from the detectors and a circuit for demodulating outputs from the AC bridge circuit.

6. An apparatus for determining the degree of elongation according to claim 4 wherein there are juxtaposed a plurality of automatic induction detectors in the transverse direction of the metal strip and outputs from the detectors are supplied to a plurality of differentiation and squaring circuits.